UNITED STATES PATENT OFFICE.

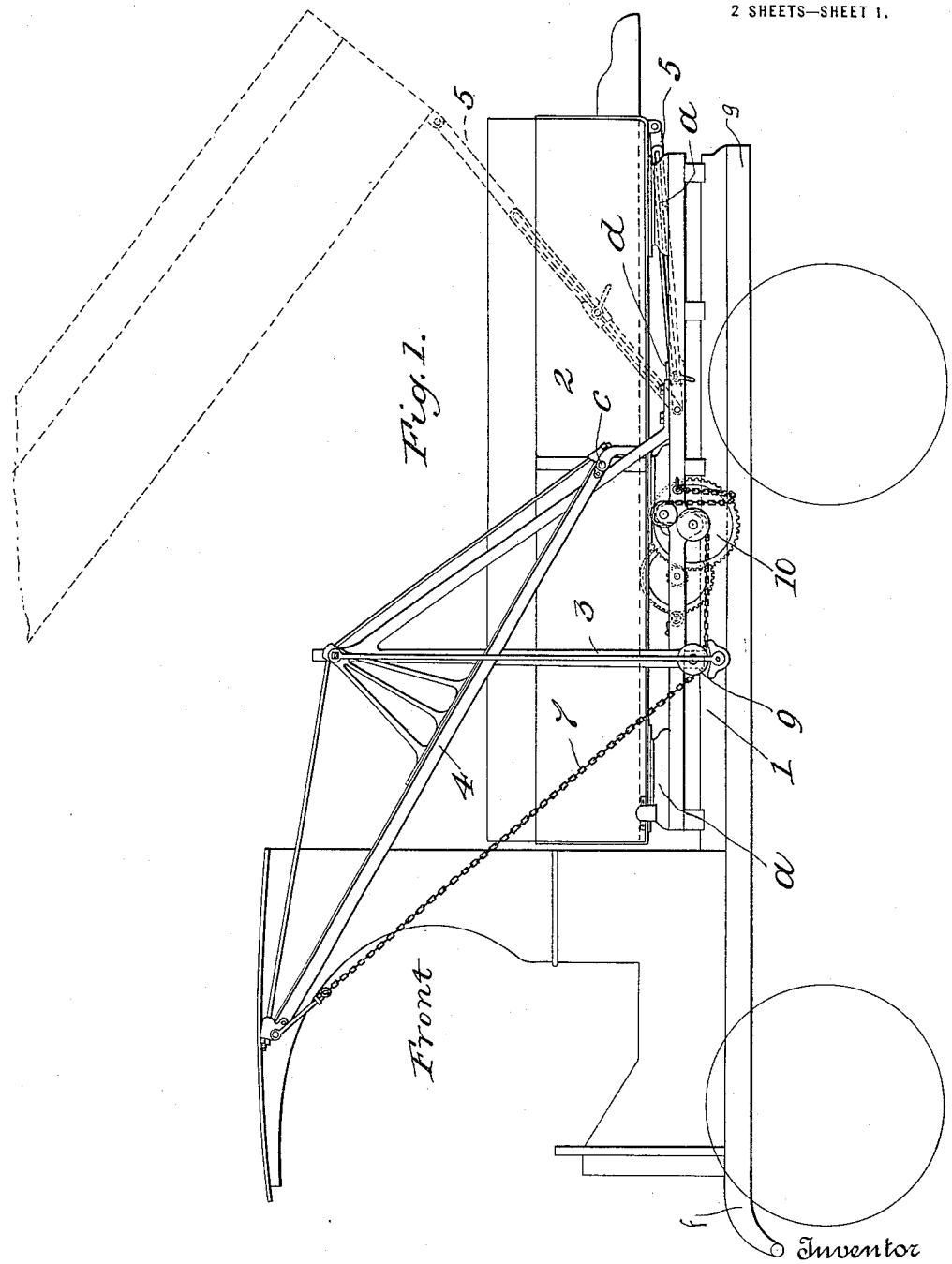

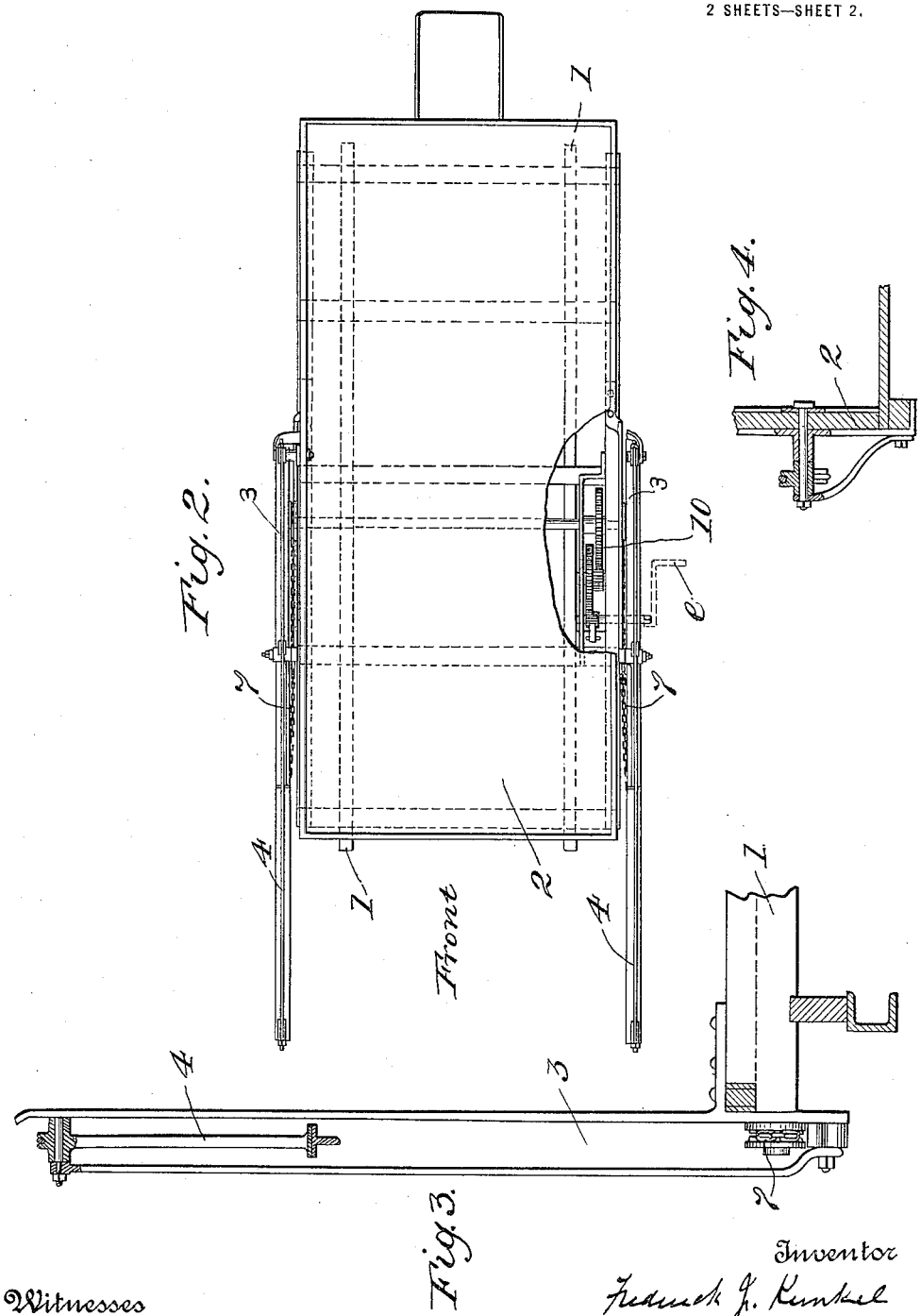

FREDERICK J. KUNKEL, OF BALTIMORE, MARYLAND.

DUMPING-WAGON.

1,155,739.  Specification of Letters Patent.  Patented Oct. 5, 1915.

Application filed December 15, 1914. Serial No. 877,291.

*To all whom it may concern:*

Be it known that I, FREDERICK J. KUNKEL, a citizen of the United States of America, and resident of Baltimore, Maryland, have invented certain Improvements in Dumping-Wagons, of which the following is a specification.

This invention relates to certain improvements in that class of dumping wagons in which the body is raised from its wheeled frame or truck by means of a pair of levers, and suitable winding mechanism attached to the truck, one end of the said levers being pivoted to the body, and the other end connected by chains to the winding mechanism; and the angle of inclination of the body when elevated to cause the discharge of its contents being effected by extensible links which connect the discharge end to the body with the truck.

In dumping coal wagons of the above class, it has been the practice to so place the elevating levers that their upper ends project rearward and beyond the rear end of the truck, and in consequence they practically increase the length of the wagon, and are liable to strike branches of trees on the sidewalk as the wagon is backed up to the curb, to be discharged of its contents.

To remedy the defects above enumerated, I reverse the position of the body-elevating levers by placing their ends to which the hoisting chains are connected, toward the front, instead of the rear end of the truck and extend them beyond the forward end of the body, and place the standards which support the said levers centrally between the front and rear ends of the truck, as will hereinafter fully appear.

In the further description of the improved dumping wagon which follows, reference is made to the accompanying drawings, forming a part hereof, and in which:—

Figure 1 is an exterior side view of the improved dumping wagon, and Fig. 2 a partly sectional top view of the same. Figs. 3 and 4 are enlarged details of the wagon.

Referring now to the drawings, 1 is the wheeled truck, the front and rear ends of which are denoted respectively by $f$ and $g$, and 2 the body of the wagon, which rests upon the fixed blocks $a$ on the truck.

3, 3 are vertical standards situated about centrally between the ends of the truck, and fastened to the side of the same.

4, 4 are skeleton levers pivoted to the standards, with their upper ends extending forwardly beyond the front end of the body, and their rear ends pivoted to the body at $c$ which is about midway of its length. By this means there is no part of the apparatus extending rearward of the body when the levers are in the positions shown in Fig. 1 to come in contact with trees or other obstructions on the pavements as the wagon is backed up thereto.

5, 5 are pivoted extensible and contractible links which connect the rear end of the body 2 with the truck. Their extensibility can be effected in any suitable manner, and they are provided with clamping devices $d$ whereby after their extension to the required length, further elongation, or contraction is prevented.

7, 7 are chains which are fastened to and extend from the upper ends of the levers 4, downward and under the idle pulleys 9 and thence to the winding devices represented as an entirety by 10. One of the crank handles whereby the gearing is operated is shown in Fig. 2 in dotted lines and denoted by $e$.

Supposing the wagon to be in its normal position or that shown in full lines in Fig. 1, that is to say, with its body resting on the blocks $a$ of the truck, and the clamping devices $d$ loose so as to admit of the extension of the links 5, and it is desired to dump the load, the chains are wound and the body thereby elevated in a practically horizontal position until the required height is reached, when the clamps $d$ are set up which prevents further extension of the links 5, and the further elevation of the rear end of the body. The winding operation is then continued until the required angle of inclination of the body as shown in dotted lines in Fig. 1 is reached. The wagon is then in a condition for the dumping operation.

I claim as my invention:—

In a dumping wagon, a wheeled truck, a body adapted to seat on the truck and a single pair of standards erected on and at the longitudinal center line of the truck about centrally of its length and projecting above the body, combined with levers pivoted to the head of the standards with their upper ends extending beyond the front end of the body, chains which lead from the forward end of the levers to suitable winding mechanism adapted to effect the elevation of the body, extensible and contractible links which at one end are pivoted to the rear end of the body, and at the other end pivoted to the truck, and clamping devices for the links, substantially as specified.

FREDERICK J. KUNKEL.

Witnesses:
JULIA B. ROBINSON,
W. T. HOWARD.